Sept. 25, 1956 R. E. GOUL 2,764,270
CYCLE COASTER BRAKE AND REVERSE DRIVE
Filed June 4, 1952 2 Sheets-Sheet 1
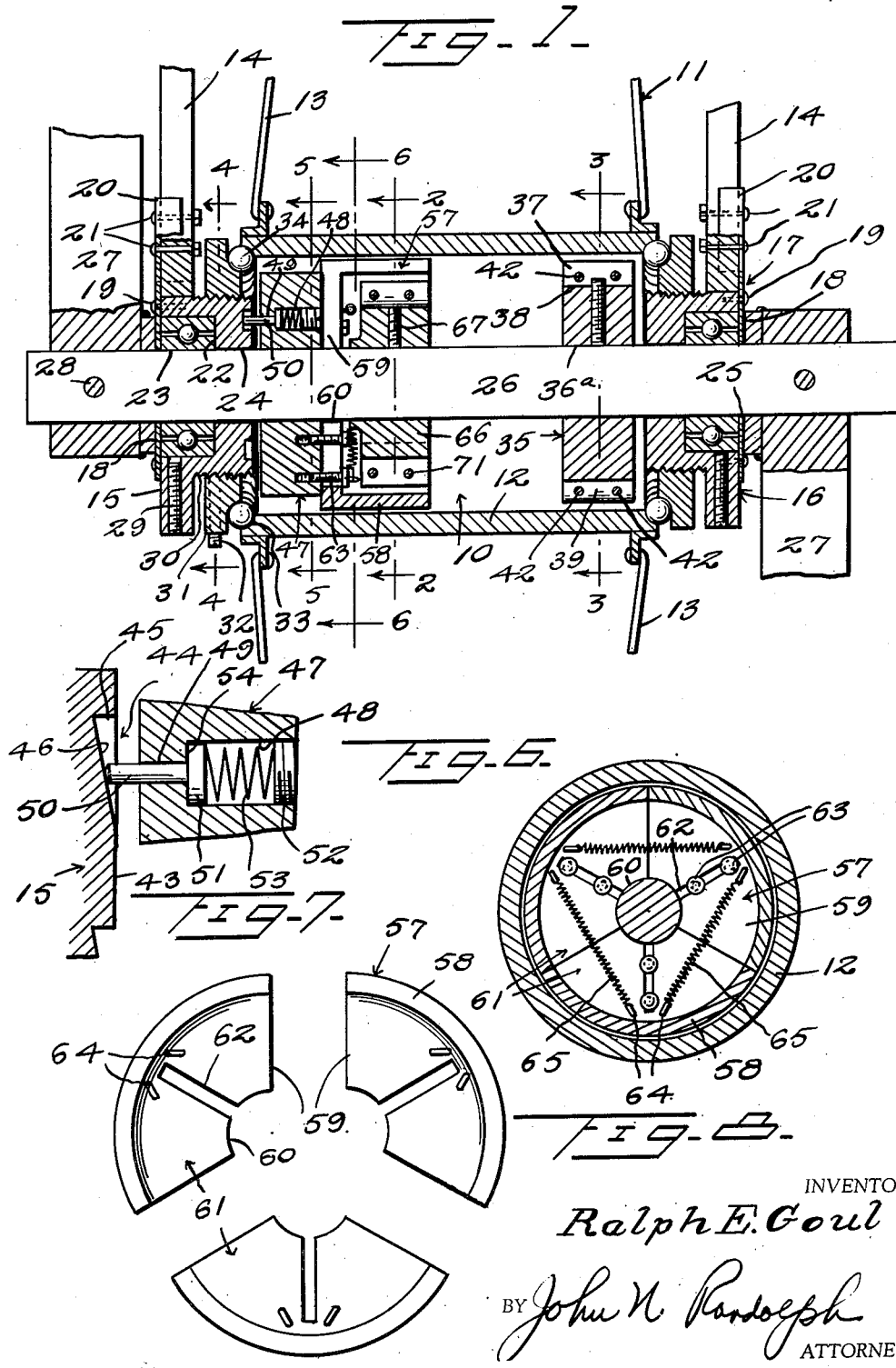
INVENTOR
Ralph E. Goul
BY John N. Randolph
ATTORNEY

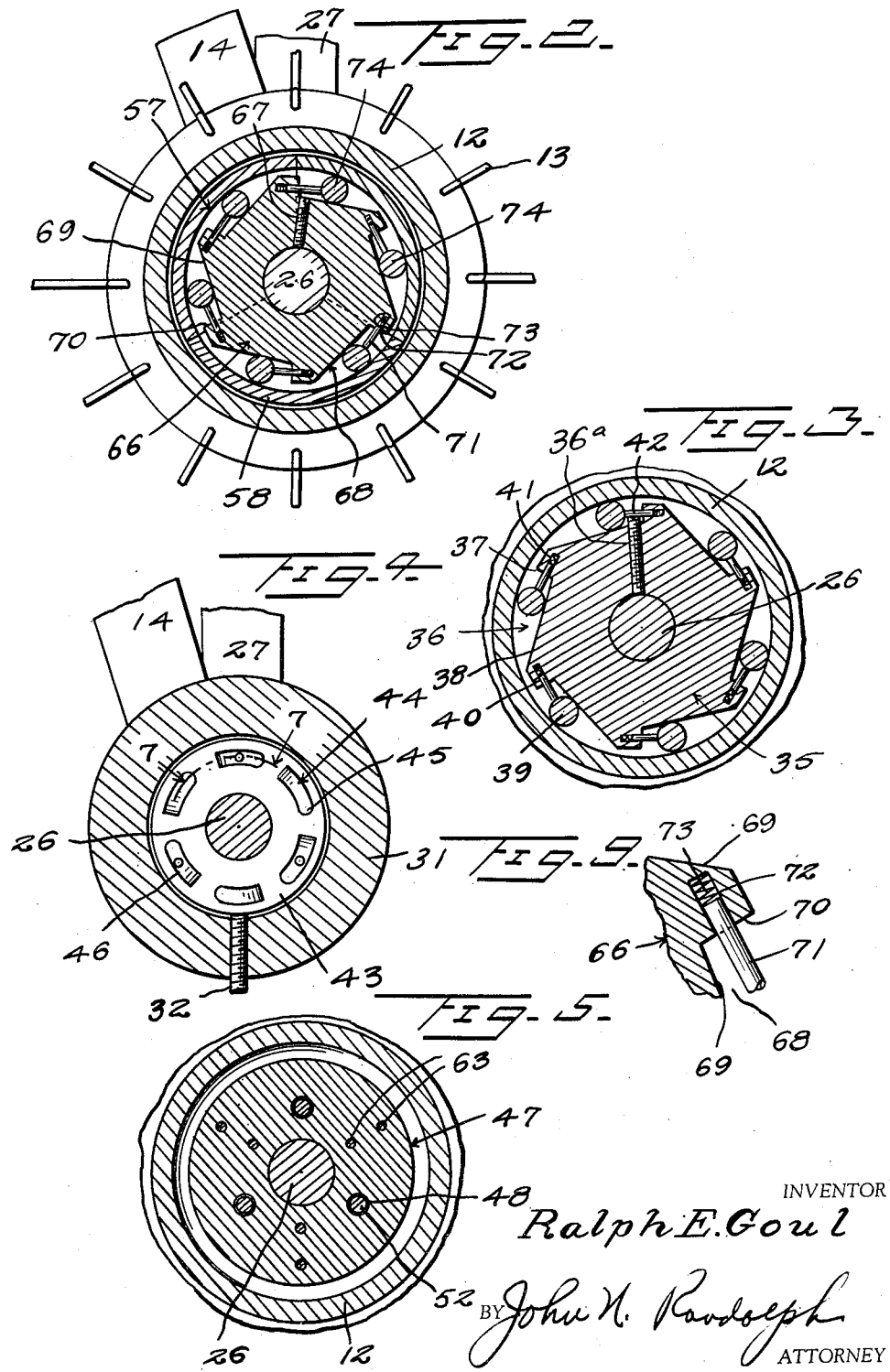

United States Patent Office 2,764,270
Patented Sept. 25, 1956

2,764,270

CYCLE COASTER BRAKE AND REVERSE DRIVE

Ralph E. Goul, Silver Spring, Md.

Application June 4, 1952, Serial No. 291,739

10 Claims. (Cl. 192—6)

This invention relates to a novel coaster brake and reverse drive for cycles which is primarily adapted for use on the front pedal crank driven wheel of a tricycle or velocipede, but which may likewise be utilized on other types of cycles such as bicycles, in conjunction with the driven wheel thereof.

More particularly, it is an aim of the present invention to provide a novel driving connection for the driving wheel of a cycle whereby free rotation of the wheel for coasting, and a reverse motion of the driving connection for applying a brake to stop the driving wheel and for thereafter rotation of the driving wheel in a reverse direction may be accomplished.

Another object of the invention is to provide a novel drive unit having a unique means for insuring disengagement of the braking and reverse driving means when the drive wheel is again driven in a forward direction.

Still another object of the invention is to provide a novel combination unit functioning to permit coasting of the driving wheel, to brake forward rotation of the driving wheel by a friction type brake means and to function as a friction clutch for driving the drive wheel in a reverse direction.

Still a further object of the invention is to provide a unit of the aforedescribed character adapted to be interposed between a wheel hub and a driving axle of said wheel whereby the axle is revolved in one direction for propelling the wheel in the same direction and impart forward motion to the cycle, or wherein the axle may remain stationary while the wheel turns in a direction for forward coasting of the cycle, or wherein the axle may be driven initially in a reverse direction opposite to the direction of rotation of the drive wheel for braking the drive wheel and for thereafter causing the drive wheel to revolve in a reverse direction.

Various other objects and advantages of the invention will hereinafter become more fully apparent from the following description of the drawings, illustrating a presently preferred embodiment thereof, and wherein:

Figure 1 is a central sectional view, partly in elevation, taken through the hub portion of a driving wheel of a cycle, showing the invention associated with a wheel hub and axle;

Figures 2, 3, 4, 5 and 6 are cross sectional views through the wheel hub, taken substantially along planes as indicated by the lines 2—2, 3—3, 4—4, 5—5 and 6—6, respectively, of Figure 1;

Figure 7 is an enlarged circumferential sectional view taken substantially along a plane as indicated by the line 7—7 of Figure 4;

Figure 8 is an exploded side elevational view looking toward the inner sides of the segments of the brake shoe, and Figure 9 is an enlarged fragmentary radial sectional view of one of the spring projected plungers as shown in Figures 2 and 3.

Referring more specifically to the drawings, the cycle forward drive, reverse and coaster brake unit comprising the invention is designated generally 10, and has herein been illustrated and will be described in conjunction with a tricycle or velocipede front drive wheel. However, as the description proceeds, it will be apparent that the unit 10 may be employed with a rear driving wheel of a bicycle or other cycle and wherein the axle may be driven by a sprocket wheel and chain drive. Referring to Figure 1, the inner portion only of a drive wheel, designated generally 11, has been shown including the hub sleeve 12 and portions of the spokes 13 connected to and extending radially from said sleeve. The wheel 11 is disposed in a frame means such as a wheel fork, only the terminal portions of the fork arms 14 of which are illustrated. The fork arm terminals 14 are provided with suitable means for attachment of the terminal of one fork arm 14 to a bushing 15 and the terminal of the other fork arm to a bushing 16. Such attachment means may comprise an attaching unit, designated generally 17, for connecting each bushing to the adjacent crossarm, each unit 17 including an annular disk portion 18 engaging against the outer side of the bushing and detachably secured thereto by a fastening 19 and an extension 20 of a portion of the annular disk 18, which is of arcuate cross section for conformably engaging partially around the adjacent fork arm 14 and which extends longitudinally thereof. The extension 20 may be secured by nut and bolt fastenings 21 to the arm 14, so that the units 17 form rigid connections between the fork arms and the bushings. Each bushing 15 and 16 includes a recessed outer portion 22 for accommodating an antifriction bearing unit 23 therein, which bearing units are retained against outward displacement by the annular disks 18. Each bushing has a bore 24 extending therethrough, the outer part of which is defined by the interior of the antifriction bearing 23, and each annular disk 18 has a central opening 25 registering with and preferably slightly larger than the bore 24. A wheel axle 26 extends through the hub sleeve 12 and through the bushings 15 and 16, which bushings provide journals in which the axle 26 is freely rotatable. A pedal crank 27 is secured to each end of the axle 26 by a fastening 28. The pedal cranks are disposed outwardly of the connectors 17.

The outer races of the antifriction bearing units 23 are retained against rotation in the bushings 15 and 16 by set-screws 29 which are threaded radially into said bushings and into engagement with the said outer races. Each of the bushings has an externally threaded inner portion 30 on which an inner ball bearing race 31 is threadedly and adjustably mounted and retained in an adjusted position by a setscrew 32 which is threaded radially through the race 31 into engagement with the threaded bearing portion 30. The end portions of the hub sleeve 12 are provided with inwardly opening concave portions forming outer races 33 between which and oppositely disposed concave annular faces of the races 31 antifriction ball bearings 34 are disposed so that the hub 12, and accordingly the wheel 11, is mounted for free rotation relatively to the bushings 15 and 16 by the races 31 and 33 and the ball bearings 34, combining therewith to form antifriction ball bearing units.

An inner clutch element comprising a relatively wide disk 35, as illustrated in Figures 1 and 3, is fixed to the axle 26 by setscrews 36a adjacent the bushing 16 and is disposed for rotation within the hub sleeve 12. The periphery of the disk 35 is provided with a series of circumferentially spaced notches 36 each having a radial shoulder 37 at its deepest end and an inclined bottom 38 extending from the inner portion of the radial shoulder and inclined therefrom in a direction away from the center of the disk 35 and having its opposite end merging with the periphery of the disk near the shoulder 37 of an adjacent notch 36. The periphery of the clutch disk 35 is spaced from the internal wall of the hub 12, A roller 39 is mounted in each notch or pocket 36 and said roller may loosely fit between the hub 12 and the inclined bottom surface 38 adjacent the deep end of the pocket 36. The clutch disk 35 is provided with a pair of bores 40 opening into the deep end of each notch 36 through its wall 37, each of which recesses contain an expansion spring 41 which bears against the inner end of a plunger 42 which is reciprocally mounted in said recess 40 and is urged outwardly thereof by the spring 41. The outer ends of the two plungers 42 disposed in each notch 36 bear against the roller 39 of said notch and urge the roller toward the shallow end of the notch. It will thus be readily apparent that the clutch disk 35 when rotated with the axle 26, in a clockwise direction as seen in Figure 3, will cause the wheel 11 to turn in the same direction for driving the wheel and the cycle of which it forms a part in a forward direction. This is accomplished by the clutch disk 35 tending to rotate clockwise relatively to the rollers 39 so that said rollers move along the inclined bottom cam surfaces 38 away from the shoulders 37 and are consequently brought into wedging engagement between said cam surfaces 38 and the hub 12 as the rollers approach the shallow ends of the pockets 36. The spring projected plungers 42 assist in moving the rollers 39 toward engaged positions for clutching the disk 35 to the hub 12 for thereby coupling the axle 26 to the wheel 11 for forward driving of the wheel with the axle.

The bushing 15 differs from the bushing 16 in that the inner face 43 of the bushing 15 is provided with a series of circumferentially spaced circumferentially extending recesses or pockets 44 each having a deep end defined by an end wall 45 and a bottom 46 which extends at an angle from said deep end toward the inner surface 43 and which merges at its opposite end with the surface 43. The end walls or shoulders 45 are disposed at corresponding ends of the pockets 44.

A collar 47 is rotatably mounted on the axle 26 adjacent the inner bearing face 43 and is rotatably disposed in the hub 12. The collar 47 contains three circumferentially spaced bores 48, each of which is radially spaced from the axle 26 and each of which includes a restricted end 49 which opens toward the bearing face 43. A pin or plunger 50 is reciprocally mounted in each restricted bore portion 49 and extends therefrom toward the bearing face 43, as best seen in Figure 6. Each pin or plunger 50 has a head 51 slidably mounted in the enlarged portion of the bore 48. A plug or spring stop 52 is threaded into the end of the bore 48 located remote to the restricted bore portion 49 and forms a stop for one end of an expansion spring 53 which is located in the bore 48 and which has its opposite end bearing against the head 51 for urging the head against the shouldered inner end 54 of the bore 48 to urge the pin 50 to a projected position in engagement with one of the pockets 46.

A brake shoe, designated generally 57, as best illustrated in Figure 7, includes an annular flange 58 which is disposed within and adjacent the hub 12 and an inwardly extending side wall 59 which extends inwardly from one end of said flange and which has a central opening 60 loosely fitting around the axle 26 adjacent the collar 47. The brake shoe 57 is formed of three corresponding segments 61 each including an annular portion 58 and a wall portion 59. The wall portion of each segment 61 has a slot 62 extending radially from the opening 60 to adjacent its annular portion 58. The brake shoe segments 61 are assembled around the axle 26 and with the walls 59 of the brake shoe disposed adjacent the side of the collar 47 which is remote to the bushing 15. Two headed screws 63 extend loosely through each of the slots 62 and are tapped into the collar 47 between the bores 48 thereof, for connecting each of the brake shoe segments 61 independently to the collar 47 for rotation of the segments with said collar and for radial sliding movement of the segments individually relatively to the collar. Each wall segment 59 is provided on its inner side and adjacent the annular flange portion 58 thereof with a pair of spring anchoring eyes 64. The adjacently disposed spring anchoring eyes 64 of the different brake shoe segments 61 are connected by pull springs 65, as best seen in Figure 6, for urging the brake shoe segments 61 inwardly against the axle 26 and out of engagement with the inner wall surface of the hub 12, as illustrated in Figure 6.

A brake shoe expander disk 66 is fixed to the axle 26 by at least one setscrew 67 and is disposed loosely within and is surrounded by the annular brake shoe portion 58. The brake shoe expander 66 is substantially identical in construction to the clutch disk 35 except that it is of a smaller diameter and the notches or pockets 68 thereof face in the opposite direction to the pockets 38 of the clutch part 35. Each of the pockets 68 includes an inclined bottom or cam surface 69 and a radial shoulder 70 at the deepest end of the pocket from which projects two spring pressed pins or plungers 71, each of which is spring pressed outwardly of a recess 72 by an expansion spring 73, as best illustrated in Figure 2. The two pins or plungers 71 of each notch or pocket 68 bear against a roller 74 contained in said pocket for urging the roller up the inclined bottom or cam surface 69 and thus radially away from the axle 26.

From the foregoing it will be readily apparent that the pedal cranks 27 may be actuated in a conventional manner for turning the axle 26 clockwise as seen in Figures 2 and 3. This will cause the clutch member 35 to rotate clockwise with the axle 26 so that the pressure of the pins or plungers 42 against the rollers 39 and the frictional engagement of said rollers with the inner surface of the hub 12, will cause the rollers to be displaced away from the shoulders 37 and in so moving over the bottom cam surfaces 38, the rollers will be displaced outwardly and wedged between portions of said surfaces 38 and the hub 12 to thereby cause the hub 12 and the wheel of which it forms a part, to be rotated clockwise with the axle 26 for propelling a cycle of which the parts constitute a part in a forward direction. The operator may stop rotation of the pedal cranks 27 to maintain the axle 26 stationary together with the clutch member 35 so that the hub 12 may continue to revolve clockwise as seen in Figure 3 and relatively to the axle and the clutch member 35, since such relative movement of the hub 12 will cause the rollers 39 to be displaced clockwise in the member 35 by their frictional engagement with the hub 12 and against the spring pressed plungers 42 toward the deep ends of the pockets 36 in which said rollers will not frictionally grip the hub 12, so that the hub may revolve relatively to the clutch member 35 to permit the cycle to coast with the axle 26 stationary.

During this forward movement and coasting of the cycle, the brake and reverse drive as illustrated in Figures 2, 4, 5 and 6 will be inoperative since the brake shoe 57 is mounted so that the axle 26 and hub 12 can each rotate relatively thereto. When the axle 26 is rotated clockwise as seen in Figure 2 for forward propulsion of the cycle, the brake expander 66 will rotate therewith and relatively to the brake shoe flange 58 so that the rollers 74 by frictional contact with the flange 58 will be displaced toward the deep ends of the pockets 68 against the action of the spring pressed plungers 71, so that the brake shoe 57 will remain disengaged from the expander 66 and from the hub 12. This will likewise be true while the hub 12 is turning clockwise relatively to the axle 26 while the cycle is coasting forwardly since the expander 66 and brake shoe 57 will then both remain stationary. Furthermore, the brake shoe 57 will be positively prevented from rotating with the hub 12 when the latter is turning clockwise as seen in Figure 2, since the brake shoe 57 is nonrotatably connected to the collar 47 by the fastenings 63 and said collar may only rotate clockwise as seen in Figure 5 until the pins 50 strike the shoulders 45 of the recesses 44 whereupon the collar 47 is prevented from turning clockwise, as seen in Figure 5, by thus being coupled by the pins 50 to the stationary bearing 15. The hub 12 and the wheel of which it forms a part may thus be revolved clockwise either by being driven by the axle 26 while clutched to the hub or by free clockwise rotation of the hub relatively to the axle while the cycle is coasting forwardly, without producing any movement of the brake shoe 57 or collar 47 so that the brake shoe, collar and expander do not function while the cycle is being driven forwardly or coasting. However, if it is desired to stop this forward movement or clockwise rotation of the hub 12, the pedal cranks 27 can be driven in the opposite direction to turn the axle 26 counterclockwise which will initially accomplish disengagement of the clutch part 35 from the hub 12, if this has not already occurred, and will at the same time cause the radial shoulders 70 of the brake expander 66 to move away from the rollers 74 which said shoulders face and so that the spring pressed plungers 71 will project the rollers 74 away from the shoulders 70. Likewise, frictional engagement of the rollers ith the inner side of the flange 58 will additionally cause said rollers to move along the cam surfaces 69 away from the shoulders 70 for wedging the rollers between the surfaces 69 and the brake shoe flange 58. The brake shoe segments 61 will thus be expanded outwardly against the pull springs 65 into frictional gripping engagement with the hub 12 to apply a frictional braking action to said hub to stop the clockwise rotation thereof and to thus stop forward movement of the cycle. Once the flange 58 has contacted the hub 12 the axle and pedal cranks may be held stationary and a clockwise torque imparted to the brake shoe segments will hold the brakes in a desired applied position. However, engagement of the pins 50 with the shoulders 45 will prevent the brake shoe 57 from turning clockwise with the hub and which would tend to cause a further expansion of the segments 61. Thus, the collar 47, pins 50 and shoulders 45 permit the brakes to be applied to a desired extent and prevent an excessive application of a braking action to the hub. After the hub 12 has ceased turning clockwise as seen in Figure 2, said hub and its wheel may be revolved counterclockwise for backing the cycle by imparting counterclockwise rotation to the axle 26 by the pedal cranks 27. Such action will effectively retain the brake shoe segments 61 in applied positions against the hub 12 and so that said segments with the expander 66 will then function as a clutch for driving the hub 12 in reverse or counterclockwise.

When it is again desired to drive the hub 12 forwardly or clockwise, as seen in Figures 2 and 3, after application of the brakes or backing, the axle 26 is again turned clockwise as previously described for causing the clutch part 35 to be coupled to the hub 12 as previously described. However, the brake or reverse will also be in an applied position. In order to effectively release the wedged rollers 74 so that they can move to the deep ends of the notches 68 against the spring pressed plungers 71 to permit the pull springs 65 to retract the brake shoe segments 61 out of engagement with the hub 12, a slight clockwise movement of the brake shoe 57 with the expander 66 and axle 26 will cause the pins 50 to travel down the inclined bottoms 66 of the recesses 64 so that said pins will engage the shoulders 45 whereupon the collar 47 is held aganst further rotation relatively to the bushing 15 and as the brake shoe segments 61 are connected by the fastenings 63 to said collar 47, the brake shoe 57 will thus be held against clockwise rotation with the hub 12 and expander 66 so that the rollers will be displaced by frictional engagement with the flange 58 toward the deep ends of the notches 69 allowing the springs 65 to draw the brake shoe segments 61 toward one another radially inwardly out of engagement wtih the hub 12.

Various suitable metals may be used for the various parts. However, the hub 12 is preferably formed of steel and the brake shoe 57 is preferably formed of bronze to provide a proper frictional engagement and braking action with the hub. The various bearings are preferably formed of steel and the bushings 15 and 16 are preferably bronze.

Various modifications and changes are contemplated and may obviously be resorted to, without departing from the spirit or scope of the invention as hereinafter defined by the appended claims.

I claim as my invention:

1. A cycle wheel drive, coaster brake and reverse comprising frame means, a driving axle journalled therein, a wheel hub journalled on said frame means and loosely disposed around and spaced from a portion of the axle, a forward driving cam type clutch including a part fixed to said axle and coupled to the hub by rotation of the axle in one direction for driving the hub and axle in the same direction, an expansible brake shoe mounted loosely around said axle and loosely within the hub, and a brake shoe expander fixed to the axle and mounted loosely within the brake shoe having cam means actuated by rotation of the axle in the opposite direction for engaging and expanding the brake shoe into engagement with the hub for imparting a braking action to the hub to check rotation of the hub relatively to the axle.

2. A device as in claim 1, said brake shoe expander and said brake shoe including means for coupling the hub to the axle for rotation of the hub with the axle in the last mentioned direction of rotation of the axle.

3. A device as in claim 2, said brake shoe comprising a plurality of segments slidably movable radially of the hub and axle into and out of engagement with the hub, and spring means connecting the brake shoe segments for urging said segments toward the axle and out of engagement with the hub.

4. A device as in claim 3, means mounted within the hub and around the axle and relatively to which the axle and hub are rotatable, means connecting each of the brake shoe segments to said third mentioned means whereby the brake shoe segments are radially slidable relatively to said third mentioned means and nonrotatably connected thereto, and coupling means detachably coupling said third mentioned means to the frame means against rotation in one direction to retain the brake shoe against rotation with the hub in the first mentioned direction of rotation of the hub, said coupling means being disengageable from said frame means to permit said third mentioned means and brake shoe to rotate with the axle and hub in the last mentioned direction of rotation of said parts whereby the brake shoe expander and brake shoe will function as a clutch for revolving the hub with the axle in the last mentioned direction of rotation of the axle.

5. A device as in claim 1, said brake shoe comprising a plurality of segments slidably movable radially of the hub and axle into and out of engagement with the hub, springs connecting the brake shoe segments for urging said segments toward the axle and out of engagement with the hub, a collar in which said axle is rotatably disposed and around which said hub is rotatably mounted, fastening means connecting said collar and brake shoe segments for slidably and nonrotatably connecting the brake shoe segments to the collar, and coupling means detachably coupling said collar to said frame means to prevent rotation of the collar and brake shoe with the hub in the first mentioned direction of rotation of said hub and for disengaging the brake shoe from the brake shoe expander when the brake shoe expander, axle and hub are rotated in the first mentioned direction to permit the brake shoe segments to be drawn together by said spring means.

6. A device as in claim 5, said coupling means being constructed and arranged whereby the collar and brake shoe may rotate with the brake shoe expander and axle in the last mentioned direction of rotation of the axle for coupling the hub to the axle for driving the wheel hub in reverse.

7. The combination with a cycle wheel driving axle, a wheel hub disposed therearound, frame means in which the axle is journalled and on which the hub is journalled loosely around and spaced from a portion of the axle, and clutch means coupling the axle and hub for driving the wheel hub with the axle in a forward direction of rotation, of an expansible brake shoe rotatably mounted in the hub and around the axle, and a brake shoe expander fixed to the axle having cam means disengageable from the brake shoe when the axle is turned for driving the hub in a forward direction of rotation and for engaging and expanding the brake shoe when the axle is turned in the opposite direction for causing the brake shoe to engage and apply a braking action to the hub.

8. A device as in claim 7, said brake shoe being formed of separate segments radially movable toward and away from the axle and hub, said brake shoe functioning with the brake shoe expander as a clutch for coupling the axle and hub when the axle is turned in the opposite direction for driving the hub in a reverse direction of rotation.

9. A device as in claim 7, and means coupling the brake shoe to said frame means when the hub is driven with the axle in a forward direction of rotation to prevent rotation of the brake shoe with the hub and for disengaging the brake shoe from the brake shoe expander.

10. A device as in claim 9, said last mentioned means being automatically disengaged from said frame means for rotation relatively thereto and with the brake shoe when the axle is coupled to the hub by the brake shoe and brake shoe expander for rotation of the hub in a reverse direction.

References Cited in the file of this patent

UNITED STATES PATENTS

| | | |
|---|---|---|
| 1,454,707 | Davis | May 8, 1923 |
| 2,138,497 | Mackowiak | Nov. 29, 1938 |

FOREIGN PATENTS

| | | |
|---|---|---|
| 635,527 | France | Mar. 17, 1928 |